United States Patent [19]
Hoeks et al.

[11] Patent Number: 5,648,415
[45] Date of Patent: Jul. 15, 1997

[54] THERMOPLASTIC COMPOSITION WITH BORON COMPOUND

[75] Inventors: Theodorus Lambertus Hoeks; Christianus Adrianus Arnoldus Claesen, both of Bergen op Zoom; Johannes Hubertus Gabriel Marie Lohmeijer, Hoogerheide, all of Netherlands; James Edward Pickett, Schenectady, N.Y.

[73] Assignee: General Electric Company, Pittsfield, Mass.

[21] Appl. No.: 476,828

[22] Filed: Jun. 7, 1995

Related U.S. Application Data

[62] Division of Ser. No. 185,725, Jan. 24, 1994, Pat. No. 5,466,733, which is a continuation of Ser. No. 989,734, Dec. 10, 1992, abandoned, which is a continuation of Ser. No. 814,308, Dec. 23, 1991, abandoned, which is a continuation of Ser. No. 511,159, Apr. 19, 1990, abandoned.

[30] Foreign Application Priority Data

May 1, 1989 [NL] Netherlands ............. 8901093

[51] Int. Cl.⁶ ............................................. C08K 3/38
[52] U.S. Cl. ............................................. 524/405
[58] Field of Search .......................... 524/126, 141, 524/405

[56] References Cited

U.S. PATENT DOCUMENTS

| | | | |
|---|---|---|---|
| 3,321,435 | 5/1967 | Fritz | 524/405 |
| 3,453,231 | 7/1969 | Bussink et al. | 524/405 |
| 3,472,814 | 10/1969 | Holoch | 524/405 |
| 3,861,425 | 1/1975 | Clark | 524/405 |
| 3,952,072 | 4/1976 | Yonemitsu et al. | 524/405 |
| 3,974,235 | 8/1976 | Cooper et al. | 524/141 |
| 4,332,714 | 6/1982 | Haaf et al. | 524/143 |
| 4,504,613 | 3/1985 | Abolins et al. | 524/126 |
| 4,713,407 | 12/1987 | Bailey et al. | 524/405 |
| 4,806,162 | 2/1989 | Ladang | 524/405 |
| 4,921,897 | 5/1990 | Danforth et al. | 524/405 |
| 5,455,292 | 10/1995 | Kakegawa et al. | 524/143 |

FOREIGN PATENT DOCUMENTS

| | | |
|---|---|---|
| 0 085 834 | 8/1983 | European Pat. Off. . |
| 0 334 296 A3 | 9/1989 | European Pat. Off. . |
| 1 522 928 | 5/1967 | France . |
| 1166775 | 10/1969 | United Kingdom . |

*Primary Examiner*—Kriellion S. Morgan

[57] ABSTRACT

The invention relates to a material which comprises at least 20% of polyphenylene ether and which comprises as a flame-retardant 0.05–10% by weight of a boron compound, for example, boric acid, $B_2O_3$, borate, salts or borate esters related to the polyphenylene ether, as well as optionally a plasticiser and further conventionally used additives.

6 Claims, No Drawings

THERMOPLASTIC COMPOSITION WITH BORON COMPOUND

This is a divisional of application Ser. No. 08/185,725 filed on Jan. 24, 1994 now U.S. Pat. No. 5,466,733; which is a continuation of application Ser. No. 07/989,734, filed Dec. 10, 1992, now abandoned; which is a continuation of application Ser. No. 07/814,308, filed Dec. 23, 1991, now abandoned; which is a continuation of application Ser. No. 07/511,159, filed Apr. 19, 1990, also now abandoned.

Material which comprises at least 20% of polyphenylene ether and which comprises a small quantity of flame-retardant and optionally a plasticiser and further conventionally used additives.

The invention relates to a material based on at least 20% of polyphenylene ether comprising polymer which comprises a small quantity of flame-retardant and optionally a plasticiser and further conventionally used additives.

Polyphenylene ethers, sometimes abbreviated as PPE, are used on an ever increasing scale. They are high-melting-point materials and, for purposes of easier processing, they may optionally be mixed with styrene polymers or a plasticiser may be added. A rubber, for example, EPDM-rubber or rubber-modified polystyrene, is often added to improve the impact strength. The correct choice between these possibilities depends on the ultimate use. "Polyphenylene ethers" are to be understood to mean herein not only polymers as described in, for example, the U.S. Pat. Nos. 3,306,874 and 3,306,875 or in the U.S. Pat. Nos. 3,257,357 and 3,257,358, but also the various copolymers, as well as mixtures of polyphenylene ethers or copolyphenylene ethers with various other polymers, for example, the additives mentioned hereinbefore, the only requirement imposed being that the polymer component of the material comprises at least 20% by weight of polyphenylene ether since the improvement of the invention to be described hereinafter will not be obtained when less than 20% is used.

For various important applications, for example, in aeroplanes, a high incombustibility and a low smoke development are required. Therefore, the combination of polyphenylene ether with plasticiser is sometimes to be preferred for purposes with stringent flammability requirements. The plasticiser, too, must then not increase the flammability and smoke development too much, which is why a plasticiser is generally to be preferred of a predominantly aromatic nature.

Furthermore the need exists for materials which in a fire do not form halogen-containing combustion gases. In the case of fire the actual fire damage often is smaller than the damage caused by the corrosion of buildings and apparatus by the halogen-containing and hence corrosive gases of combustion.

For making polymeric materials flame-retardant, various approaches may be used in general. For example, the quantity of polymer in the material may be reduced by the addition of inorganic fillers. However, large quantities hereof are required which would deteriorate the physical properties of the polyphenylene ethers to an unacceptable extent. Another possibility is the mixing with materials which, during burning, splitt off water or carbon dioxide, but such materials cannot so readily be used in polymers having high processing temperatures, for example, PPE. As flame-retardants in polymer materials are usually used compounds which comprise phosphorus, fluorine, chlorine and/or bromine, sometimes in combination with an antimony compound. Such flame-retardants exert their effect by poisoning the flame. This results in an incomplete combustion of the polymer, which in turn usually causes an increase of the smoke emission.

Another possibility which has not yet been further investigated is to reach the flame-retarding effect by increasing the yield of carbonised material (remaining weight upon combustion). This also involves that the emission of combustible gases and hence of smoke is reduced.

It has now been found that boron compounds, for example, borid acid, boron oxide or a borate are good flame-retardants and this not only for the combination of polyphenylene ether and plasticiser which is used for stringent combustibility requirements, but also for combinations which have to satisfy less stringent requirements and which comprise other constituents in combination with at least 20% of polyphenylene ether in their polymer component. The effect of the said boron compounds is probably based on an increase of the yield of carbonised material.

Materials which comprise a polyphenylene ether, optionally a plasticiser and a flame-retardant are described in the non-pre-published Netherlands Patent Applications 8802502 (8-CB-10,430) and 8802919 (8-CB-10,461). As a flame-retardant the said materials always comprise a mixture of 0.2–15% by weight of a fluorinated polymer or copolymer and 0.05–10% by weight of a boron-containing compound.

It has now been found that good flame-retardant properties are also obtained without a fluorinated polymer or copolymer being used.

The invention therefore provides a material of the type mentioned in the opening paragraph which is characterised in that the material comprises as a flame-retardant 0.05–10% by weight of a boron compound related to the polyphenylene ether.

As a boron compound may be used, for example, boric acid $B_2O_3$, a borate salt or an organic borate. Boric acid or $B_2O_3$ is to be preferred.

In this connection it is bo be noted that, although the invention has primarily been developed for polyphenylene ether-containing materials without or preferably with a plasticiser, the invention also relates to materials having less polyphenylene ether in the polymer component, for example, combinations of polyphenylene ether with high-impact polystyrene or rubbers, combinations which may comprise large or even predominant (up to 80% by weight) quantities of polystyrene or rubber. On the basis of their nature, these latter materials are much more combustible, but the combustibility thereof is also reduced by the flame-retardant, albeit that herewith not such a large inhibition of the combustibility and smoke development can be achieved as with the materials which consist predominantly of polyphenylene ethers.

As already stated, the plasticiser has a predominant aromatic nature. For example, polyaromatic esters are to be considered, for example, diphenylphthalate, triphenyl trimellitate, and the like. A commercially available plasticiser which has proved to be suitable is pentaerytritol tetrabenzoate (commercial product Benzoflex S552). An aromatic phosphate is preferably used as a plasticiser. Phosphates also improve the flame-retarding effect. Organic polyphosphates, for example, bi- or tri-phosphates, are preferably used, However, suitable non-aromatic plasticisers may also often be used.

The material of the invention may moreover comprise one or more additives conventionally used for such materials, for example, fillers, reinforcing fibres, stabilisers, pigments and dyes, plasticisers, mould release agents, agents to improve the notched impact value. If further flame-retardants are to be added, these are preferably not the conventional flame poisons, for example, the comparatively small-molecular phosphorus compounds.

In so far as a sufficient difference exists between the processing temperature of the material and the temperature at which the flame-retardant can react with the polyphenylene ether or activates the polyphenylene in any manner, the components of the flame-retardant used according to the invention may be incorporated in the basic polymer at any desired instant, for example, by simply mixing the materials prior to the conventional extrusion or, optionally, during the extrusion, for example, approximately halfway or near the extrusion head. Furthermore the addition may also be done during the final processing, for example, during injection moulding or designing by extrusion. Furthermore, a master batch may be prepared of the flame-retardant and may be added to the basic mixture. In general this leads to a better distribution of the flame-retardant, as a result of which a better effect is obtained with the same concentration. When choosing among the various possibilities, one will in general be led by the said difference between the temperature at which the flame-retardant mixture becomes active and the processing temperature of the material.

It is to be noted that the use of phosphonic acid salts as flame-retardants has been described in EP-A-0,245,207. These may be salts with a metal or metalloid from the group IIA, IIB, IIIA, and VA of the Periodic Table of the Elements. Although these include a boron compound, boron is not further mentioned; the preferred salts are aluminium salts. It further relates again to compounds which exert their flame-retarding effect by flame poisoning.

EXAMPLES I AND II

A material was prepared from 95 parts by weight of poly-(2,6-dimethyl-1,4-phenylene ether) having an intrinsic viscosity of 45 ml/g (measured in chloroform at 25° C.), 12.5 parts by weight of a phosphate mixture consisting substantially of tetraphenylresorcinoldiphosphate, 7 parts by weight of poly-octenylene having an intrinsic viscosity of 94 ml/g (solution of 0.5 g in 100 ml of toluene), 2 parts by weight of boric acid and 5 parts by weight of crystal clear polystyrene. The said constituents were compounded in an extruder. (Example I). Standardized test pieces were injection-moulded from the resulting material to determine the impact strength according to Izod, the flame-retarding properties according to UL-94 and the smoke density according to ASTME-662 in DS units.

A second material was prepared with the same components as described hereinbefore in which, however, first a master batch consisting of 2 parts by weight of boric acid and 5 parts by weight of crystal clear polystyrene was prepared. 7 Parts by weight of the said master batch were compounded with the same quantities as indicated hereinbefore (Example II).

The resulting properties were as follows:

TABLE

| Example | I<br>no master batch | II<br>with master batch |
| --- | --- | --- |
| Izod notched impact strength J/m | 250 | 350 |
| UL-value (1.6 mm) | V-0 | V-0 |
| Smoke density (DS units) | | |

TABLE-continued

| Example | I<br>no master batch | II<br>with master batch |
| --- | --- | --- |
| after 1.5 min. | 2 | 0 |
| 4.0 min. | 109 | 7 |
| 8.0 min. | 156 | 40 |
| 20.0 min. | 158 | 88 |

EXAMPLES III AND IV

COMPARATIVE EXAMPLE A

Various test pieces were compressed (at 270° C., 3 minutes) from poly-(2,6-dimethyl-1,4-phenylene ether) having an intrinsic viscosity of 47 ml/g, boric acid, and pentaerytritol tetrabenzoate. The smoke density of the test pieces was determined. The quantities used of the various constituents and the smoke densities found are recorded in the table hereinafter.

The resulting properties were as follows:

TABLE

| Example | III | IV | A |
| --- | --- | --- | --- |
| Composition (parts by weight) | | | |
| polyphenylene ether | 100 | 85 | 100 |
| boric acid | 2 | 2 | — |
| benzoate | — | 15 | — |
| Smoke density (DS-units) | | | |
| after 4.0 min. | 46 | 50 | 140 |
| 8.0 min. | 90 | 120 | 400 |
| 20.0 min. | 110 | 210 | 500 |

What is claimed is:

1. A composition comprising:

(a) at least 20 percent of polyphenylene ether without a plasticizer and (b) 0.05 to 10 percent by weight of a boron compound based on the weight of the polyphenylene ether;

wherein the smoke density of the composition after 20 minutes as measured according to ASTM E-662 is less than 50 percent of the smoke density of the same composition not containing the boron compound.

2. The composition of claim 1 wherein the smoke density measured according to ASTM E-662 is less than 50 percent of the smoke density of the same composition not containing the boron compound after 20 minutes.

3. The composition of claim 1 wherein the smoke density is less than 35 percent of the smoke density of the same composition without the boron composition after 20 minutes.

4. The composition of claim 1, further comprising a high-impact polystyrene.

5. An article made from the composition of claim 1.

6. An article made from the composition of claim 4.

* * * * *